US012625115B2

(12) United States Patent
Koga et al.

(10) Patent No.: US 12,625,115 B2
(45) Date of Patent: May 12, 2026

(54) SAMPLE VAPORIZATION UNIT AND GAS CHROMATOGRAPH

(71) Applicant: Shimadzu Corporation, Kyoto (JP)

(72) Inventors: Kiyonori Koga, Kyoto (JP); Kenichi Okumura, Kyoto (JP); Yuji Nakama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 301 days.

(21) Appl. No.: 18/564,508

(22) PCT Filed: May 31, 2021

(86) PCT No.: PCT/JP2021/020686
§ 371 (c)(1),
(2) Date: Nov. 27, 2023

(87) PCT Pub. No.: WO2022/254523
PCT Pub. Date: Dec. 8, 2022

(65) Prior Publication Data
US 2024/0288405 A1 Aug. 29, 2024

(51) Int. Cl.
G01N 30/12 (2006.01)
G01N 30/02 (2006.01)
G01N 30/18 (2006.01)
(52) U.S. Cl.
CPC ............ G01N 30/12 (2013.01); G01N 30/18 (2013.01); *G01N 2030/025* (2013.01); *G01N 2030/126* (2013.01)

(58) Field of Classification Search
None
See application file for complete search history.

(56) References Cited

U.S. PATENT DOCUMENTS

| | | | | |
|---|---|---|---|---|
| 4,644,140 A | * | 2/1987 | Hillinger | B29C 45/74 219/535 |
| 4,759,210 A | * | 7/1988 | Wohltjen | G01N 33/0031 73/31.07 |
| 11,513,103 B2 | * | 11/2022 | Schmittmann | G01N 30/6043 |
| 2016/0341695 A1 | | 11/2016 | Zhang et al. | |

FOREIGN PATENT DOCUMENTS

| | | |
|---|---|---|
| JP | 2000-314731 A | 11/2000 |
| JP | 2017-504804 B | 6/2018 |

OTHER PUBLICATIONS

Written Opinion of the International Searching Authority for PCT application PCT/JP2021/020686, dated Aug. 17, 2021.

* cited by examiner

*Primary Examiner* — Daniel S Larkin
(74) *Attorney, Agent, or Firm* — Muir Patent Law, PLLC

(57) ABSTRACT

A sample vaporization unit configured for vaporizing a sample injected from a syringe needle while supplying a carrier gas into a column is provided with a pipe, a heat conductive member, and a heater. The column is inserted into the pipe. The heat conductive member is provided along the outer circumference of the pipe. The heater is provided along the outer circumference of the heat conductive member. The heat conductive member is in line contact with the pipe along the axial direction in which the column extends at a plurality of circumferential locations on the outer circumferential surface of the pipe.

9 Claims, 9 Drawing Sheets

SAMPLE VAPORIZATION UNIT AND GAS CHROMATOGRAPH

TECHNICAL FIELD

The present invention relates to a sample vaporization unit for vaporizing a sample injected from a syringe needle while supplying a carrier gas into a column and also related to a gas chromatograph equipped with the sample vaporization unit.

BACKGROUND ART

For example, an analysis device, such as, e.g., a gas chromatograph, is equipped with a column for separating components in a sample and a sample introduction unit for introducing the sample into the column. A carrier gas is introduced into the column via the sample introduction unit. In the sample introduction unit, the sample is injected into the carrier gas before the carrier gas is introduced into the column. The sample in the carrier gas is heated by the sample introduction unit to be vaporized and then introduced into the column (see, for example, Patent Document 1 listed below).

PRIOR ART DOCUMENT

Patent Document

Patent Document 1: Japanese Unexamined Patent Application Publication No. 2000-314731

SUMMARY OF THE INVENTION

Problems to be Solved by the Invention

Some sample introduction units used for a temperature-rising analysis and the like have a configuration in which a syringe needle is inserted into the tip end portion of the column to directly inject the sample into the column. In this type of sample introduction unit, a long and narrow column with an extremely small outer diameter must be efficiently heated from the outside. However, no effective technology has been proposed in the past as a configuration for efficiently heating the column and the sample in the column in this type of sample introduction unit. As a result, it is difficult to heat the column at high speed, and as a result, the temperature distribution in the heated column sometimes becomes non-uniform. Further, the technical concept for efficiently heating a sample is desired not only in a configuration in which the sample is directly injected into the column but also in a configuration in which the sample is vaporized in the sample vaporization unit and then introduced into the column.

The present invention has been made in view of the above-described circumstances, and an object of the present invention is to provide a sample vaporization unit and a gas chromatograph capable of efficiently heating a sample.

Means for Solving the Problems

The first aspect of the present invention relates to a sample vaporization unit for vaporizing a sample injected from a syringe needle while supplying a carrier gas in a column. The sample vaporization unit is equipped with a pipe, a heat conductive member, and a heater. The column is inserted into the pipe. The heat conductive member is provided along the outer circumference of the pipe. The heater is provided along the outer circumference of the heat conductive member. The heat conductive member is in line contact with the pipe along the axial direction in which the column extends at a plurality of circumferential locations on the outer circumferential surface of the pipe.

The second aspect of the present invention relates to a gas chromatograph equipped with a sample vaporization unit, a column, and a detector. The column is attached to the sample vaporization unit. The detector detects components in the sample separated in the column.

Effects of the Invention

According to the present invention, it is possible to efficiently heat the sample.

EMBODIMENTS FOR CARRYING OUT THE INVENTION

1. Overall Configuration of Gas Chromatograph

Figure 1:
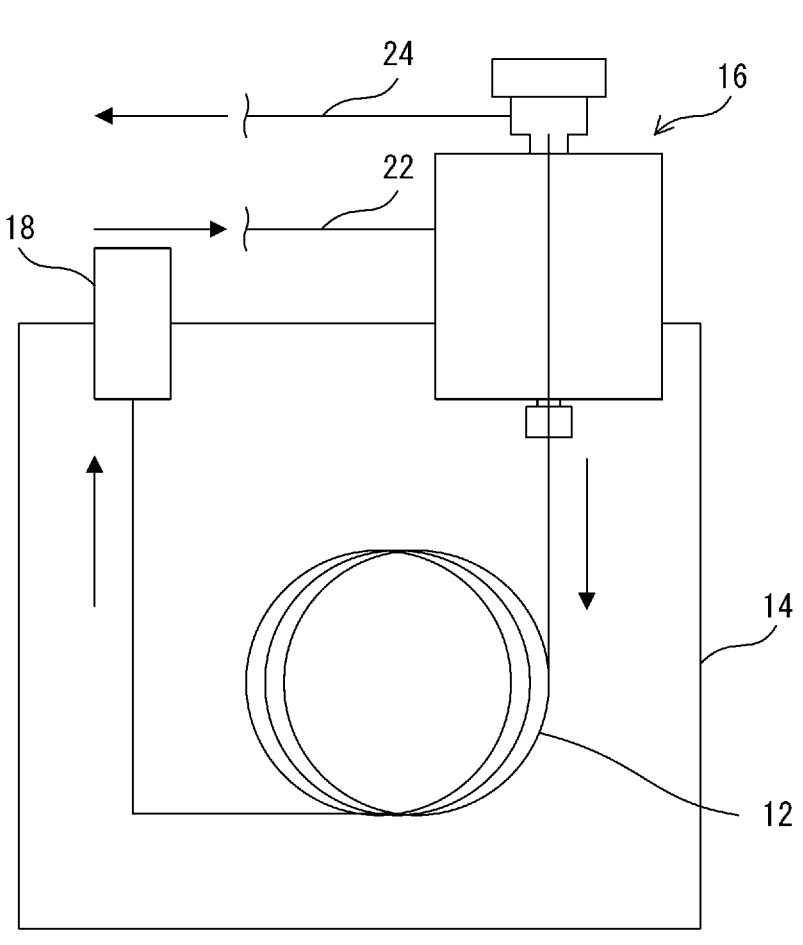
FIG. 1 is a schematic view showing one example of a gas chromatograph according to a first embodiment.

FIG. 1 is a schematic diagram showing one example of a gas chromatograph 10 according to a first embodiment. The gas chromatograph 10 is used for an analysis by supplying a sample together with a carrier gas into the column 12 and is equipped with a column oven 14, a sample vaporization unit 16, and a detector 18, in addition to the column 12 mentioned above. This gas chromatograph 10 can perform a temperature-rising analysis.

The column 12 is composed of, for example, a capillary column. The column 12 is accommodated in the column oven 14 together with a heater, a fan, and the like (which are not shown in the figure). The column oven 14 is used to heat the column 12, and a heater and a fan (which are not shown) are driven as needed during the analysis.

The sample vaporization unit 16 is used to supply a carrier gas and a sample into the column 12, and the column 12 is attached to the sample vaporization unit to penetrate the inside thereof. A liquid sample is supplied to the upstream of the column 12 together with a carrier gas, and the liquid sample is vaporized in the column 12.

Further, connected to the sample vaporization unit 16 are a gas supply flow path 22 and a purge flow path 24. The gas supply flow path 22 is a flow path for supplying a carrier gas to the sample vaporization unit 16. As the carrier gas, an inert gas, such as, e.g., a helium gas and an argon gas, can be exemplified.

The purge flow path 24 is a flow path for discharging undesired components generated from a septum 38 (see FIG. 3) described below and the like to the outside by discharging a part of the carrier gas to the outside when the carrier gas and the sample are supplied into the column 12.

The detector 18 is configured by, for example, a hydrogen flame ionization detector (FID). The detector 18 sequentially detects each component in the sample contained in the carrier gas introduced from the column 12. Note that the detector 18 is not limited to an FID, and any other detector can be used.

In such a gas chromatograph 10, when analysis processing is performed, a carrier gas is supplied through the gas supply flow path 22 to the sample vaporization unit 16. Further, when the sample as an analysis target is supplied to the inside of the column 12, the sample is vaporized at the upstream of the column 12. The components in the sample are separated during the process of passing through the column 12. In the detector 18, each component in the sample contained in the carrier gas introduced from the column 12 is detected sequentially, and a chromatogram is generated based on the detection results by the detector 18.

2. Configuration of Sample Vaporization Unit

Figure 2:
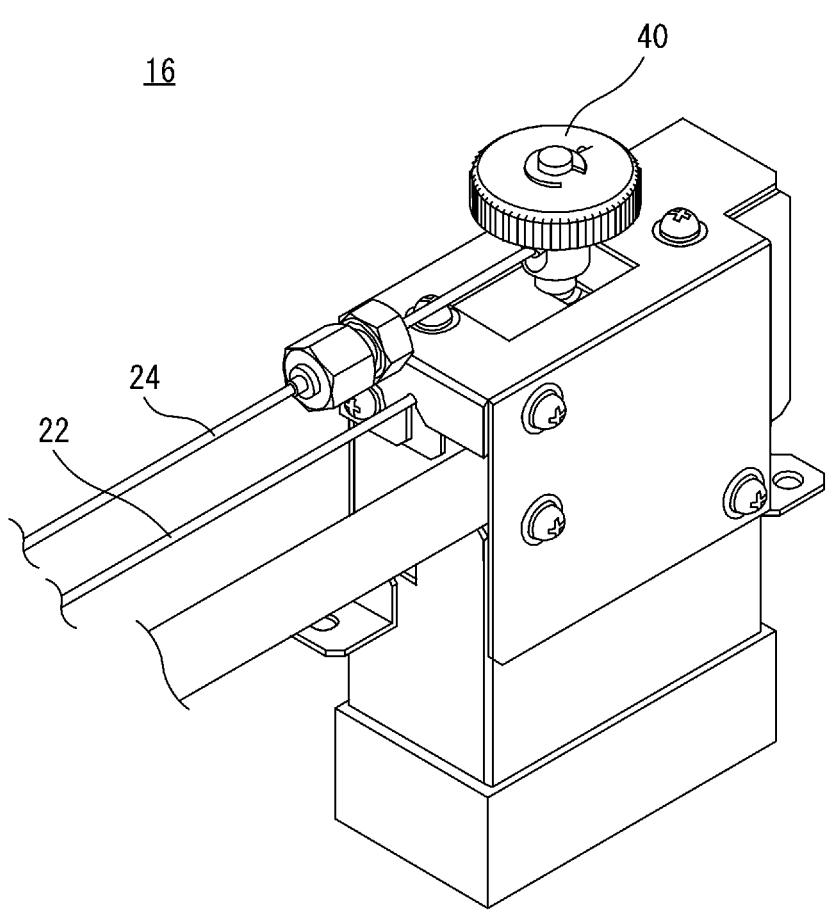
FIG. 2 is a perspective view showing one example of a sample vaporization unit according to the first embodiment.
Figure 3:
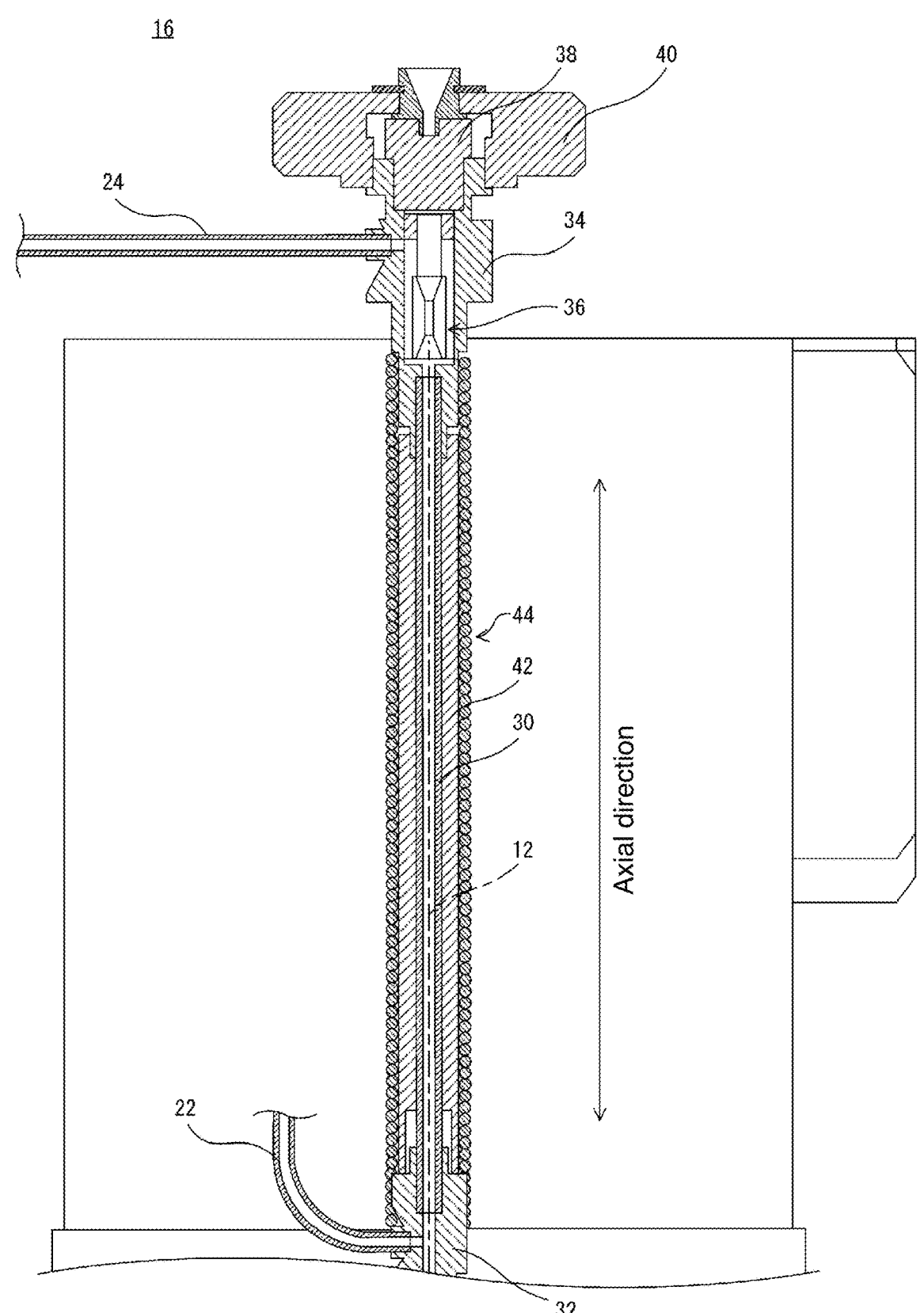
FIG. 3 is a cross-sectional view showing one example of a sample vaporization unit according to the first embodiment.
Figure 4:
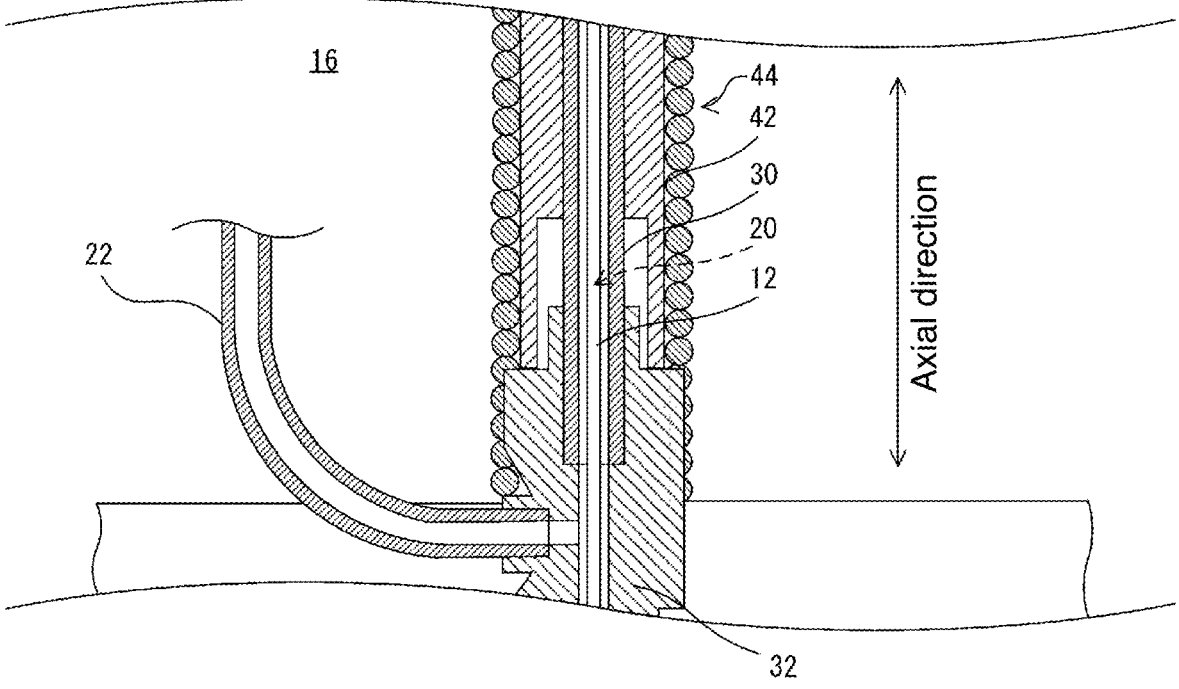
FIG. 4 is a cross-sectional view showing a downstream side of a column and its surroundings in one example of a sample vaporization unit according to the first embodiment.
Figure 5:
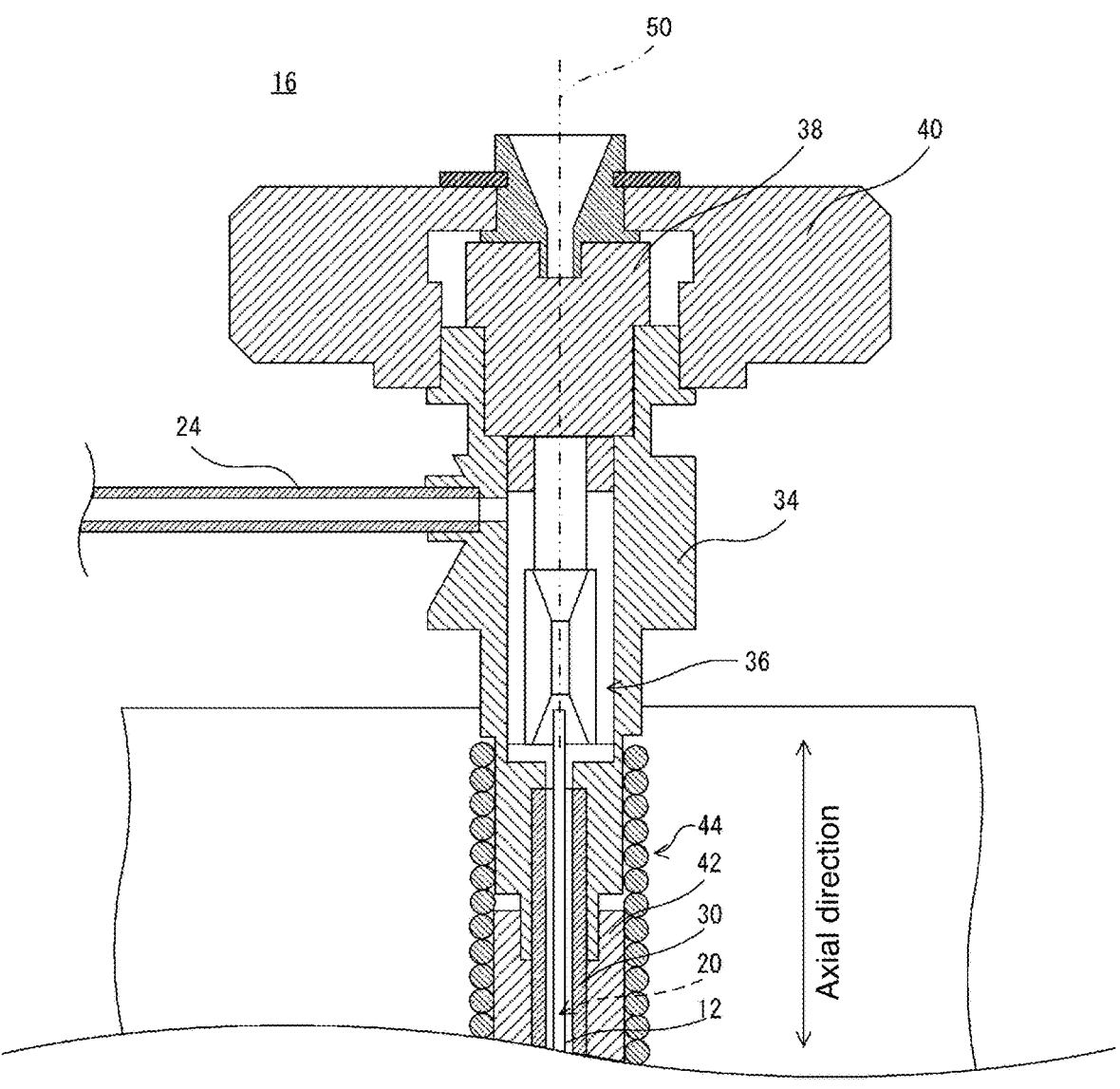
FIG. 5 is a cross-sectional view showing an upstream side of a column and its surroundings in one example of a sample vaporization unit according to the first embodiment.

FIG. 2 is a perspective view showing one example of the sample vaporization unit 16 of the first embodiment. FIG. 3 is a cross-sectional view showing one example of the sample vaporization unit 16 of the first embodiment. FIG. 4 is a cross-sectional view showing the downstream side of the column 12 and its surroundings in one example of the sample vaporization unit 16 of the first embodiment. FIG. 5 is a cross-sectional view showing the upstream side of the column 12 and its surroundings in one example of the sample vaporization unit 16 of the first embodiment. Note that in FIG. 3, the column 12 is shown by a single dotted line. Further, in FIG. 5, the syringe needle 50 is shown by a double-dashed line.

The sample vaporization unit 16 is provided with a pipe 30, a holding portion 32, a cylindrical portion 34, an insert 36, a septum 38, a septum cap 40, a heat conductive member 42, a heater 44, etc.

The pipe 30 is a long cylindrical member made of, for example, stainless steel, and the column 12 penetrates the inside of the pipe 30. Note that the inner diameter of the pipe 30 is larger than the outer diameter of the column 12, so there is a gap between the inner circumferential surface of the pipe 30 and the outer circumferential surface of the column 12. The pipe 30 has, for example, an outer diameter of about 2 mm and an inner diameter of about 1 mm, and the column 12 has, for example, an outer diameter of about 0.7 mm and an inner diameter of about 0.5 mm. That is, a gap of about 0.3 mm is formed between the inner circumferential surface of the pipe 30 and the outer circumferential surface of the column 12. However, the dimensions of the column 12 and the pipe 30 are not limited to the above values, and the inner diameter of the pipe 30 may be set arbitrarily depending on the outer diameter of the column 12. For example, in a case where the outer diameter of the column 12 is 0.5 mm to 1.0 mm, the inner diameter of the pipe 30 may be 0.7 mm to 1.5 mm. The thickness of the pipe 30 may be, for example, 0.3 mm to 0.7 mm. The length of the pipe 30 is, for example, 5 cm to 10 cm, specifically about 6 cm.

The holding portion 32 is formed in a cylindrical shape and holds the lower end portion of the pipe 30. Note that the lower end portion of the pipe 30 refers to the end portion corresponding to the downstream side of the column 12 in the sample vaporization unit 16.

In the example shown in FIG. 3 and FIG. 4, the inner circumferential surface of the holding portion 32 includes at least a first region having an inner diameter equal to the outer diameter of the pipe 30 and a second region having an inner diameter equal to the inner diameter of the pipe 30. In other words, the inner diameter of the holding portion 32 changes stepwise from the first region to the second region. As shown in FIG. 3 and FIG. 4, in a case where the pipe 30 is held in a state in which the lower end of the pipe 30 is inserted into the first region of the holding portion 32, the second region of the holding portion 32 and the interior space of the pipe 30 are communicated.

The cylindrical portion 34 is formed in a cylindrical shape in the same manner as the holding portion 32 and holds the top end portion of the pipe 30. Note that the upper end portion of the pipe 30 refers to the end portion corresponding to the upstream side of the column 12 in the sample vaporization unit 16.

In the example shown in FIG. 3 and FIG. 5, the inner circumferential surface of the cylindrical portion 34 includes at least a first region having an inner diameter equal to the outer diameter of the pipe 30 and a second region having an inner diameter equal to the inner diameter of the pipe 30. In other words, the inner diameter of the cylindrical portion 34 changes stepwise from the first region to the second region. As shown in FIG. 3 and FIG. 5, in a case where the pipe 30 is held in a state in which the upper end portion of the pipe 30 is inserted into the first region of the cylindrical portion 34, the second region of the cylindrical portion 34 and the interior space of the pipe 30 are communicated.

Further, the interior space of the cylindrical portion 34 (the space on the upper side of the first region and the second region) includes a space (insertion space) into which the upstream side end portion of the column 12 is inserted, and an insert 36 is arranged in the insertion space. The insert 36 is formed in a cylindrical shape with a neck portion having an inner diameter smaller than that of the rest of the inner circumferential surface, and the inner diameter of the neck portion of the insert 36 is smaller than the outer diameter of the column 12. That is, the upstream side end portion of the column 12 does not penetrate through the insert 36, but extends to the vicinity of the neck portion of the insert 36.

According to the insert 36, it is possible to arrange the central axis of the column 12 and the central axis of the syringe needle 50 for injecting a sample into the column 12 approximately at the same position in the axial direction, which is a direction in which the column 12 extends.

The septum 38 is attached to the cylindrical portion 34 to seal the insertion space of the cylindrical portion 34 at a position facing the insert 36. The septum cap 40 is attached to the cylindrical portion 34 to cover the septum 38.

Further, the septum cap 40 is configured by a cylindrical nut with threads formed on its inner surface. Therefore, when the septum cap 40 is tightened, the septum 38 is held to the septum cap 40 and the cylindrical portion 34. The tip end portion of the syringe needle 50 is inserted through the septum 38 into the insertion space of the cylindrical portion 34 to be inserted into the tip end portion of the column 12 through the insert 36. With this, the sample can be injected into the column 12 through the tip end portion of the syringe needle 50.

The gas supply flow path 22 communicates with the inside of the pipe 30 in the sample vaporization unit 16. Specifically, the gas supply flow path 22 communicates with the gap between the inner circumferential surface of the pipe 30 and the outer circumferential surface of the column 12. In the example shown in FIG. 3 and FIG. 4, the gas supply flow path 22 communicates with the inside of the pipe 30 via the interior space of the holding portion 32.

The purge flow path 24 communicates with the insertion space of the cylindrical portion 34. In the example shown in FIG. 3 and FIG. 5, the purge flow path 24 communicates with the insertion space of the cylindrical portion 34 along the direction perpendicular to the axial direction outside the sample vaporization unit 16.

The heat conductive member 42 is provided along the outer circumference of the pipe 30 to cover the pipe 30. The heat conductive member 42 is, for example, about 5 mm in outer diameter and about 2 mm in inner diameter. Note that the dimensions of the heat conductive member 42 are not limited to the above values, and the inner diameter of the heat conductive member 42 may be set arbitrarily depending on the outer diameter of the pipe 30. For example, in a case where the outer diameter of the pipe 30 is 1.5 mm to 3.0 mm, the inner diameter of the heat conductive member 42 may also be 1.5 mm to 3.0 mm to correspond to the outer diameter of the pipe 30. The thickness of the heat conductive member 42 may be, for example, 1.0 mm to 2.0 mm. Furthermore, although described below, the heat conductive member 42 comes into line contact with the pipe 30 along the axial direction at a plurality of circumferential locations on the outer circumferential surface of the pipe 30.

In the first embodiment, metal is used for the heat conductive member 42. Furthermore, as the heat conductive member 42, it is preferable to use metal that has high thermal conductivity and is soft (easy to machine). Therefore, as the heat conductive member 42, it is preferable to use, for example, aluminum, copper, or brass. Note that the heat conductive member 42 is not specifically limited as long as it is a member with heat transfer properties.

The heater 44 is provided along the outer circumference of the heat conductive member 42. In the first embodiment, as the heater 44, a rod-shaped easy-to-bend heater (bending heater), such as a sheath heater, is used. In the example shown in FIG. 3 to FIG. 5, the heater 44 is wound not only around the heat conductive member 42 but also around the outer circumferences of a part of the holding portion 32 and a part of the cylindrical portion 34. Note that as the heater 44, other general-purpose heaters may be used.

In the sample vaporization unit 16, the gas supply flow path 22, the interior space of the holding portion 32, the interior space of the pipe 30, the interior space of the cylindrical portion 34, etc., are integrated. Therefore, the carrier gas supplied to the inside of the sample vaporization unit 16 from the gas supply flow path 22 flows upward through the gap between the inner circumferential surface of the pipe 30 and the outer circumferential surface of the column 12, and flows into the column 12 from the upper end portion of the column 12. In this state, as shown in FIG. 5, by inserting the syringe needle 50 through the septum 38 into the column 12 and injecting the sample into the column 12 from the tip end portion of the needle 50, the sample can be supplied into the column 12 together with the carrier gas. At this time, the undesired components generated from the septum 38, etc., are discharged into the purge flow path 24 along with the carrier gas. Furthermore, in the first embodiment, the column 12 is heated by the heater 44 via the pipe 30 and the heat conductive member 42, so the sample is heated and vaporized in the column 12 penetrating the pipe 30. In other words, the interior of the portion of the column 12 inserted into the pipe 30 constitutes the sample vaporization region 20 for vaporizing the liquid sample.

Further, in the first embodiment, the heat conductive member 42 is in line contact with the pipe 30 along the axial direction at a plurality of circumferential locations on the outer circumferential surface of the pipe 30, so that the number of contact points between the heat conductive member 42 and the pipe 30 can be increased. Therefore, according to the sample vaporization unit 16 of the first embodiment, the pipe 30, the heat conductive member 42, and the heater 44 can efficiently heat the column 12 and the sample in the column 12.

3. Configuration of Heat Conductive Ember

The heat conductive member 42 has at least one slit 45. The slit 45 is a cut portion continuously extending from one end of the heat conductive member 42 in the axial direction to the other end, and the heat conductive member 42 is partially divided via the slit 45. Furthermore, the heat conductive member 42 is fixed to the pipe 30 in a state of being pressed in a direction in which the width of the slit 45 decreases. Here, the direction in which the width of the slit 45 decreases may be any direction intersecting with the slit 45, and is not limited to the direction perpendicular to the slit 45.

Figure 6:
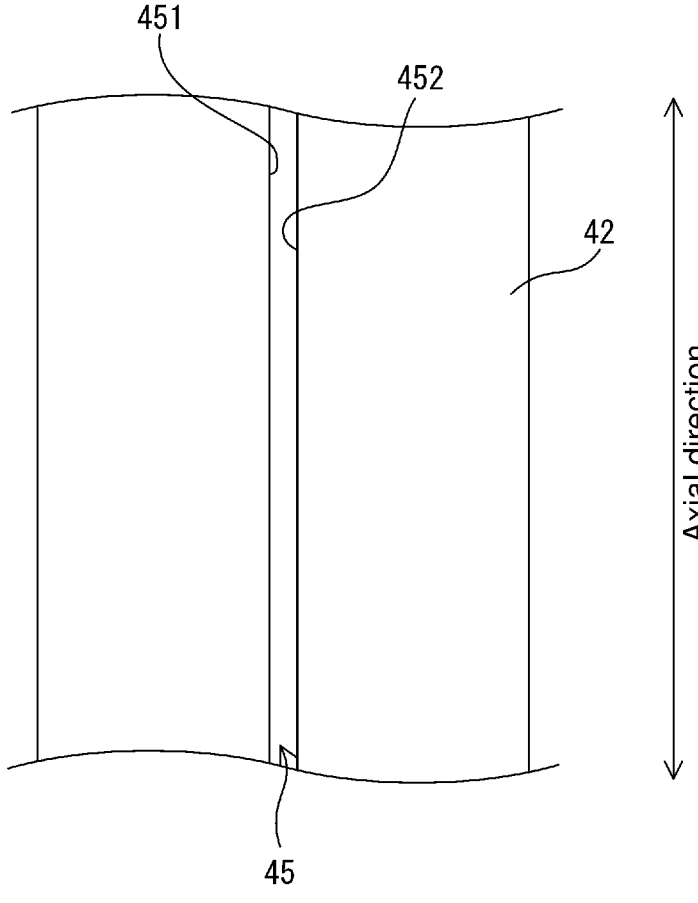
FIG. 6 is a schematic side view showing one example of a slit according to the first embodiment.

FIG. 6 is a schematic side view showing one example of the slit 45 in the first embodiment. The slit 45 may extend straight along the axial direction, as shown in FIG. 6. In this case, the end faces 451 and 452 of the heat conductive member 42 divided by the slit 45 each extend parallel to the axial direction with a spaced therebetween. Therefore, by applying a force to the heat conductive member 42 toward the direction intersecting with the axial direction, the end faces 451 and 452 approach each other, and the heat conductive member 42 is pressed in the direction in which the width of the slit 45 (the distance between the end faces 451 and 452) decreases.

Figure 7:
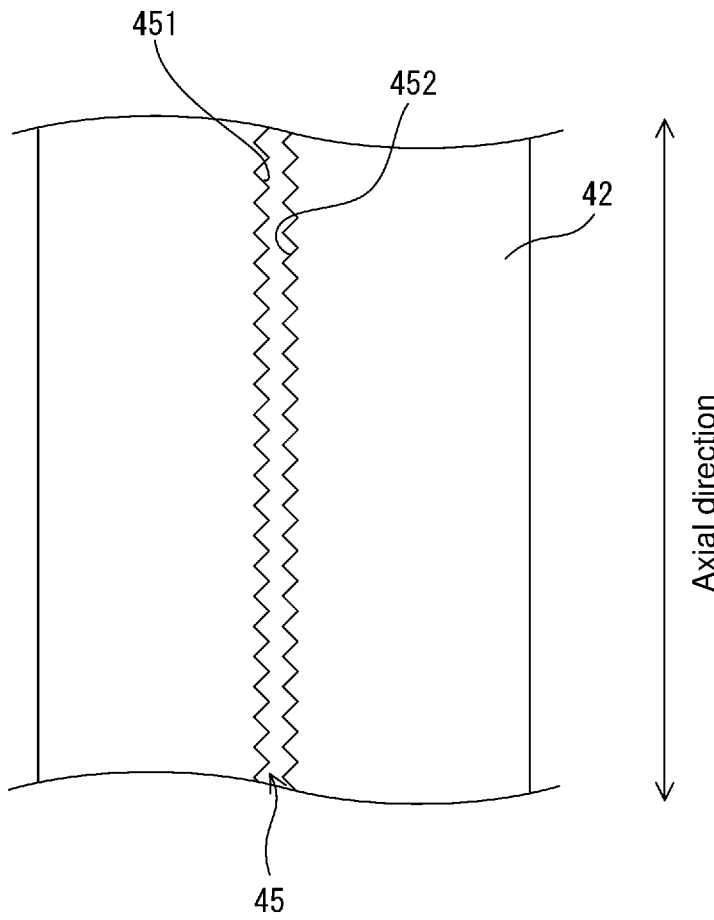
FIG. 7 is a schematic side view showing another example of a slit according to the first embodiment.

FIG. 7 is a schematic side view showing another example of the slit 45 of the first embodiment. The slit 45 may extend while bending or curving in a direction intersecting with the axial direction, as shown in FIG. 7. In other words, each of the end faces 451 and 452 of the heat conductive member 42 divided by the slit 45 may be configured by a bent or curved surface. Each of the end faces 451 and 452 may be continuously bent or curved from one end to the other in the axial direction, or may be bent or curved only at one part in the axial direction. In this example in FIG. 7, each of the end faces 451 and 452 is configured by a bent surface and has a plurality of bent portions (convex portions and concave portions), but in a case where each bent portion is formed in a curved shape, each of the end faces 451 and 452 can be configured by a surface with a plurality of curved portions (convex portions and concave portions).

In FIG. 7, the end faces 451 and 452 of the heat conductive member 42 face each other with a gap between them. Therefore, by applying a force to the heat conductive member 42 in the direction intersecting with the axial direction, the end faces 451 and 452 approach each other, and the heat conductive member 42 is pressed in the direction in which the width of the slit 45 (the distance between the end faces 451 and 452) decreases. In this case, the plurality of convex portions formed on one end face 451 enters the plurality of concave portions formed on the other end face 452, and the plurality of convex portions formed on the other end face 452 enters the plurality of concave portions formed on the one end face 451.

Figure 8:
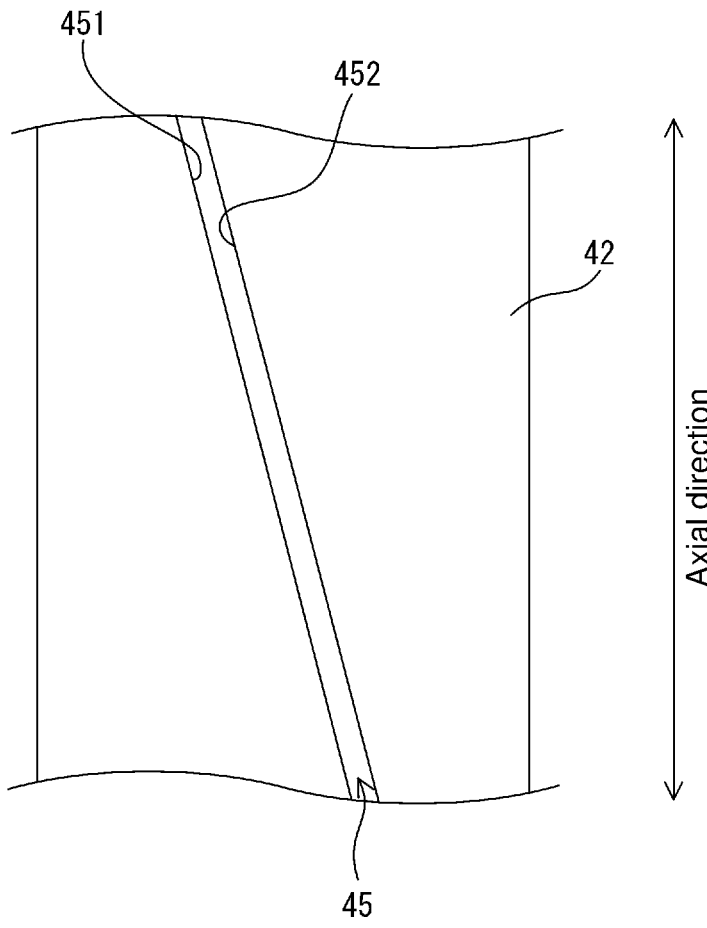
FIG. 8 is a schematic side view showing still another example of a slit according to the first embodiment.

FIG. 8 is a schematic side view showing yet another example of the slit 45 of the first embodiment. The slit 45 may extend straight in a direction intersecting with the axial direction, as shown in FIG. 8. In other words, when the heat conductive member 42 is viewed from the side, the slit 45 may extend straight in a direction oblique and straight in a direction intersecting with the axial direction, instead of extending straight in the axial direction as shown in FIG. 6. In this case, the inclination angle of the slit 45 relative to the axial direction is not specifically limited. That is, the slit 45 may be inclined at a large inclination angle from one end of the axial direction of the slit 45 to the other end such that the slit 45 travels one or more turns around the outer circumference of the heat conductive member 42, or the slit 45 may be inclined at a small angle such that the slit 45 travels less than one turn around the outer circumference. For example, in a case where the slit 45 travels one or more turns around the outer circumference of the heat conductive member 42 from one end of the slit 45 to the other end in the axial direction, the heat conductive member 42 has a spiral-shaped slit 45.

As described above, in a case where the slit 45 is obliquely formed in a direction intersecting with the axial direction, when a force is applied to the heat conductive member 42 in the axial direction and the direction intersecting with the slit, it is possible to bring the respective end faces 451 and 452 into contact with each other and fix the heat conductive member 42 to the pipe 30 while sliding the respective end faces 451 and 452 against each other. In this case, the slit 45 between the end faces 451 and 452 is filled, and the heat conductive member 42 is provided along the entire outer circumferential surface of the pipe 30. Therefore, the column 12 and the sample in the column 12 can be efficiently heated.

In a case where the heat conductive member 42 has only one slit 45 as described above, the cross-section of the heat conductive member 42 when viewed from the axial direction is formed in a C-shape. These are merely examples of the slit 45, and the slit 45 can be formed in various other shapes.

Figure 9:
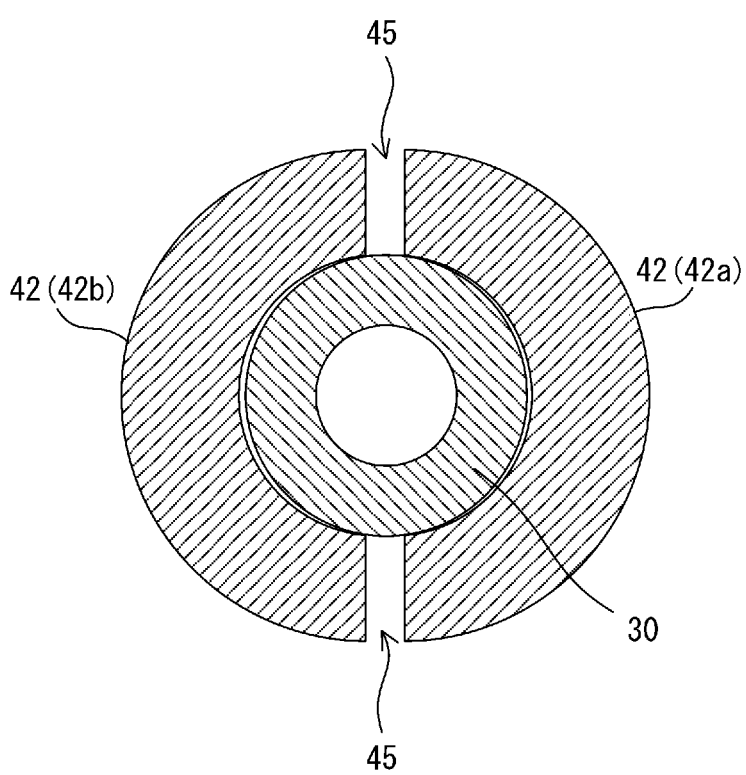
FIG. 9 is a cross-sectional view when one example of the heat conductive member of the second embodiment is viewed from the axial direction.

Further, in a case where the heat conductive member 42 has two or more slits 45, the heat conductive member 42 will be separated into the same number of slits 45. FIG. 9 is a cross-sectional view when one example of the heat conductive member 42 of the second embodiment is viewed from the axial direction. In the example shown in FIG. 9, the heat conductive member 42 has two slits 45, and each slit 45 extends straight along the axial direction, as in the example shown in FIG. 6. However, the shapes of the plurality of slits 45 are not specifically limited, and may be, for example, shapes as shown in FIG. 7 or FIG. 8. Note that the column 12 is not shown in FIG. 9.

The heat conductive member 42 shown in FIG. 9 has two slits 45, so that the heat conductive member 42 is separated into a first heat transfer portion 42a and a second heat transfer portion 42b. The slits 45 may be formed at equal intervals in the circumferential direction or formed at different intervals. In the example shown in FIG. 9, two slits 45 are formed at equal intervals in the circumferential direction to separate the first heat transfer portion 42a and the second heat transfer portion 42b, which are formed in a semicircular shape in cross section of the same shape. In this case, the two slits 45 are arranged symmetrically across the pipe 30. In the example shown in FIG. 9, the heat conductive member 42 is fixed to the pipe 30 in a state in which the first heat transfer portion 42a and the second heat transfer portion 42b are pressed in a direction of decreasing the widths of the two slits 45.

In the heat conductive member 42 (the first heat transfer portion 42a and the second heat transfer portion 42b in the example shown in FIG. 9), the radius of curvature of the inner circumferential surface preferably coincides with the radius of curvature of the outer circumferential surface of the pipe 30. However, since the pipe 30 is very thin, it is difficult to match the radius of curvature of the inner circumferential surface of the heat conductive member 42 and the radius of curvature of the outer circumferential surface of the pipe 30. Therefore, as shown in FIG. 9, the heat conductive member 42 usually comes into line contact with the pipe 30 along the axial direction at several circumferential surface locations on the outer circumferential surface of the pipe 30.

In the example shown in FIG. 9, the radius of curvature of the inner circumferential surface of the heat conductive member 42 (the first heat transfer portion 42a and the second heat transfer portion 42b) is smaller than the radius of curvature of the outer circumferential surface of the pipe 30. In this case, the first heat transfer portion 42a and the second heat transfer portion 42b come into line contact with the pipe 30 along the axial direction at least at two locations on the outer circumferential surface of the pipe 30 in the circumferential direction. On the other hand, in a case where the radius of curvature of the inner circumferential surface of the heat conductive member 42 (the first heat transfer portion 42a and the second heat transfer portion 42b) is larger than the radius of curvature of the outer circumferential surface of the pipe 30, in some cases, the first heat transfer portion 42a and the second heat transfer portion 42b come into line contact with the pipe 30 along the axial direction at one location on the outer circumferential surface of the pipe 30 in the circumferential direction. Even in this case, the first heat transfer portion 42a and the second heat transfer portion 42b each come into line contact with the outer circumferential surface of the pipe 30 at one location, and therefore, the heat conductive member 42 as a whole comes into line contact with the outer circumferential surface of the pipe 30 at two locations. As the number of slits 45 increases, the contact points between the inner circumferential surface of the heat conductive member 42 and the outer circumferential surface of the pipe 30 increase. Even in a configuration in which only one slit 45 is provided, the contact points between the inner circumferential surface of the heat conductive member 42 and the outer circumferential surface of the pipe 30 increase as compared with a configuration in which no slit 45 is provided.

Further, in order to reduce the efficiency of heating the column 12 and the sample in the column 12, the width of the slit 45 is preferred to be small. For example, in the case where the heat conductive member 42 has a plurality of slits 45 and the width of each slit 45 is set to be small, the contact points between the inner circumferential surface of the heat conductive member 42 and the outer circumferential surface of the pipe 30 can be increased while preventing the reduction of efficiency of heating the column 12 and the sample in the column 12.

Further, in the first embodiment, using the pressing force from the heater 44 wound around the outer circumference of the heat conductive member 42, the heat conductive member 42 is fixed to the pipe 30. In other words, the heater 44 is attached to the heat conductive member 42 in such a manner that it is tightened against the outer circumferential surface of the heat conductive member 42. In this case, the heater 44 not only serves as a heat source but also presses and fixes the heat conductive member 42, and therefore, there is no need to provide a separate component to press and fix the heat conductive member 42 to the pipe 30. In the first embodiment, although no spacing is provided between the mutually adjacent portions of the heaters 44 wound around the outer circumference of the heat conductive member 42, spacing may be provided to form a temperature distribution along the axial direction.

Note that the heat conductive member 42 may be fixed to the pipe 30 using a heat-resistant fixing member different from the heater. For example, the heat conductive member 42 may be fixed to the pipe 30 by winding a string-like fixing member around the heat conductive member 42. In this case, the fixing member is preferably wound around at least both end portions of the heat conductive member 42 in the axial direction, and it is more preferable that the fixing member be wound around the center portion of the heat conductive member 42 in the axial direction as well. Further, the outer circumferential surface of the heat conductive member 42 may have a groove for fitting a fixing member.

The position where the heat conductive member 42 and the pipe 30 come into line contact may vary due to various factors, such as the number of the slits 45 in the heat conductive member 42, the shape of the slits 45, and the method of fixing the heat conductive member 42 to the pipe 30. In other words, there is a case in which the heat conductive member 42 and the pipe 30 come into contact with each other with a line having a width. In this case, the linear contact may include surface contact.

4. Modifications

In the above embodiments, a configuration is described in which a sample is injected from a syringe needle 50 inserted into the tip portion of the column 12, and the sample is vaporized in the column 12. However, the present invention is not limited to the configuration in which a sample is injected directly into the column 12, but can also be applied to a configuration in which a sample is vaporized in the pipe 30 and then introduced into the column 12. In other words, the column 12 is not limited to the configuration in which it penetrates the inside of the pipe 30, but may be configured so that only the tip end of the column 12 is inserted into the inside of the pipe 30. In this case, after the sample is vaporized in the sample vaporization region 20 formed inside the pipe 30, the vaporized sample is introduced into the column 12 together with the carrier gas. The pipe 30 may be configured as an insert that can be attached to and detached from the sample vaporization unit 16.

5. Aspects

It would be understood by those skilled in the art that the plurality of exemplary embodiments described above is specific examples of the following aspects.

(Item 1)

A sample vaporization unit according to one aspect is a sample vaporization unit for vaporizing a sample injected from a syringe needle while supplying a carrier gas into a column, the sample vaporization unit includes:

a pipe into which the column is inserted;

a heat conductive member provided along an outer circumference of the pipe; and a heater provided along an outer circumference of the heat conductive member, wherein the heat conductive member is in line contact with the pipe along an axial direction in which the column extends at a plurality of circumferential locations on the outer circumferential surface of the pipe.

According to the sample vaporization unit as recited in the above-described Item 1, the heat conductive member comes into line contact with the pipe at a plurality of circumferential locations on the outer circumferential surface of the pipe along the axial direction, which allows the heat conductive member to have more contact points with the pipe. Therefore, it is possible to efficiently heat the sample by the pipe, the heat conductive member, and the heater.

(Item 2)

In the sample vaporization unit as recited in the above-described Item 1, it may be configured such that the heat conductive member is provide with at least one slit and is fixed to the pipe in a state of being pressed in a direction in which a width of the slit decreases.

According to the sample vaporization unit as recited in the above-described Item 2, by forming at least one slit, it is possible to increase the number of contact points between the inner circumferential surface of the heat conductive member and the outer circumferential surface of the pipe as compared with the case in which no slit is formed.

(Item 3)

In the sample vaporization unit as recited in the above-described Item 2, it may be configured such that the heat conductive member is separated into at least a first heat transfer portion and a second heat transfer portion by the slit and is fixed to the pipe in a state of being pressed in a direction in which a width of the slit between the first heat transfer portion and the second heat transfer portion decreases.

According to the sample vaporization unit as recited in the above-described Item 3, the first heat transfer portion and the second heat transfer portion separated from each other come into line contact with the outer circumferential surface of the pipe at least at one location, so that it is possible for the entire heat conductive member to come into line contact with the outer circumferential surface of the pipe at least at two locations. Accordingly, it is possible to increase the number of contact points between the inner circumferential surface of the heat conductive member and the outer circumferential surface of the pipe.

(Item 4)

In the sample vaporization unit as recited in the above-described Item 2, it may be configured such that the heat conductive member is formed in a C-shaped cross-section having one slit.

According to the sample vaporization unit as recited in the above-described Item 4, it is possible to increase the number of contact points between the inner circumferential surface of the heat conductive member and the outer circumferential surface of the pipe by forming a slit, and the heat conductive member can be treated as a single member, which facilitates the assembly work.

(Item 5)

In the sample vaporization unit as recited in any one of the above-described Items 2 to 4, it may be configured such that the heat conductive member is fixed to the pipe by a pressing force from the heater wound around the outer circumference of the heat conductive member.

According to the sample vaporization unit as recited in the above-described Item 5, the heater plays the role of pressing and fixing the heat conductive member, so there is no need to provide a separate component to press and fix the heat conductive member to the pipe.

(Item 6)

In the sample vaporization unit as recited in any one of the above-described Items 2 to 5, it may be configured such that the slit extends linearly along the axial direction.

According to the sample vaporization unit as recited in the above-described Item 6, by simply forming a slit of a simple shape that extends straight along the axial direction, it is possible to increase the number of contact points between the inner circumferential surface of the heat conductive member and the outer circumferential surface of the pipe.
(Item 7)

In the sample vaporization unit as recited in any one of the above-described Items 2 to 5, it may be configured such that the slit extends to bend or curve in a direction intersecting with the axial direction.

According to the sample vaporization unit as recited in the above-described Item 7, a plurality of convex and concave portions is formed on each end face of the heat conductive member divided by the slit. Therefore, the plurality of convex portions formed on one end face enters the plurality of concave portions formed on the other end face, and the plurality of convex portions formed on the other end face enters the plurality of concave portions formed on the one end face. With this, it is possible to prevent each end face from shifting along the axial direction.
(Item 8)

In the sample vaporization unit as recited in any one of the above-described Items 2 to 5, it may be configured such that the slit extends linearly in a direction intersecting with the axial direction.

According to the sample vaporization unit as recited in the above-described Item 8, it is possible to fix the heat conductive member to the pipe by bringing end faces of the heat conductive member divided by the slit into contact with each other and sliding the end faces against each other.
(Item 9)

In the sample vaporization unit as recited in any one of the above-described Items 1 to 8, it may be configured such that the sample vaporization unit injects the sample from a syringe needle inserted in a tip end portion of the column while supplying a carrier gas into the column and vaporizes the sample in the column.

According to the sample vaporization unit as recited in the above-described Item 9, it is possible to efficiently heat the column and the sample in the column by the pipe, the heat conductive member, and the heater.
(Item 10)

A gas chromatograph according to one aspect of the present invention may include:

the sample vaporization unit as recited in any one of the above-described Items 1 to 9;

a column attached to the sample vaporization unit; and a detector configured to detect components in the sample separated in the column.

According to the gas chromatograph as recited in the above-described Item 10, it is possible to efficiently heat a sample to perform the analysis.

DESCRIPTION OF REFERENCE SYMBOLS

10: Gas chromatograph
12: Column
16: Configuration of Sample Vaporization Unit
18: Detector
30: Pipe
42: Heat conductive member
42a: First heat transfer portion 42b: Second heat transfer portion
44: Heater
45: Slit
50: Needle

The invention claimed is:

1. A sample vaporization unit configured for vaporizing a sample injected from a syringe needle while supplying a carrier gas into a column, the sample vaporization unit comprising:
   a pipe into which the column is inserted;
   a heat conductive member provided along an outer circumference of the pipe; and
   a heater provided along an outer circumference of the heat conductive member,
   wherein the heat conductive member is in line contact with the pipe along an axial direction in which the column extends at a plurality of circumferential locations on the outer circumferential surface of the pipe, and
   wherein the heat conductive member is provided with at least a first slit that is a cut portion of the heat conductive member and is fixed to the pipe in a state of being pressed in a direction in which a width of the first slit decreases.

2. The sample vaporization unit as recited in claim 1, wherein the heat conductive member is separated into at least a first heat transfer portion and a second heat transfer portion by the first slit and is fixed to the pipe in a state of being pressed in a direction in which a width of the first slit between the first heat transfer portion and the second heat transfer portion decreases.

3. The sample vaporization unit as recited in claim 1, wherein the heat conductive member is formed in a C-shaped cross-section having only one slit, the one slit being the first slit.

4. The sample vaporization unit as recited in claim 1, wherein the heat conductive member is fixed to the pipe by a pressing force from the heater wound around an outer circumference of the heat conductive member.

5. The sample vaporization unit as recited in claim 1, wherein the first slit extends linearly along the axial direction.

6. The sample vaporization unit as recited in claim 1, wherein the first slit extends to bend or curve in a direction intersecting with the axial direction.

7. The sample vaporization unit as recited in claim 1, wherein the first slit extends linearly in a direction intersecting with the axial direction.

8. The sample vaporization unit as recited in claim 1, wherein the sample vaporization unit injects the sample from the syringe needle inserted in a tip end portion of the column while supplying the carrier gas into the column and vaporizes the sample in the column.

9. A gas chromatograph comprising:
   the sample vaporization unit as recited in claim 1;
   the column attached to the sample vaporization unit; and
   a detector configured to detect components in the sample separated in the column.

* * * * *